Patented Aug. 17, 1926.

1,596,460

UNITED STATES PATENT OFFICE.

ROBERT EMANUEL SCHMIDT AND BERTHOLD STEIN, OF ELBERFELD, GERMANY, ASSIGNORS TO GRASSELLI DYESTUFF CORPORATION, OF NEW YORK, N. Y., A CORPORATION OF DELAWARE.

OXAZINE DYESTUFF OF THE ANTHRAQUINONE SERIES.

No Drawing. Application filed February 11, 1925, Serial No. 8,568, and in Germany February 18, 1924.

We have invented new and useful improvements in oxazine dyestuffs of the anthraquinone series of which the following is a specification.

Our invention refers to the preparation of new substituted 4-hydroxyanthraquinone-benzoic acid oxazines having probably the following formula:

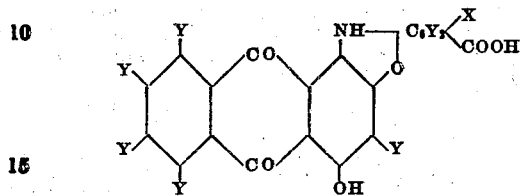

in which X stands for an amino, alkylamino or hydroxyl group and Y for a hydrogen or halogen atom or a sulfo or methyl group, etc. These new oxazines dye wool in an acid bath from blue to green shades; on wool mordanted with chromium or aluminum salts they give similar blue to green shades, distinguished by excellent fastness properties, especially to milling and light. Animal fibres dyed with our new oxazines form also part of our invention.

These substituted anthraquinone-benzoic acid oxazines are obtained by a simultaneous oxidation and condensation of purpuramid

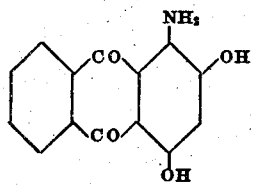

or its derivatives with ortho-hydroxy-, ortho-amino-, ortho-alkyl-amino-benzoic acids, or its derivatives having a free para-position in respect to the hydroxyl, amino or alkylamino group, such as salicylic acid, cresotinic acid, anthranilic acid, phenyl-glycin-ortho-carboxylic acid etc. The oxidative condensation does not lead, however, directly to the oxazines, but to products of a higher oxidation grade. The chemical constitution of these is not quite known, it is assumed, and this is confirmed by the amount of oxidant used, that they are of the type of hetero nuclear quinones or quinoneimides. That these quinonic bodies are not produced by a further oxidation of primarily obtained oxazines is shown by the fact that these quinones or quinoneimides can be detected during the first stages of the oxidation process, while unreacted purpuramid is still present. These hetero nuclear quinonic bodies are now easily reduced to our new oxazines.

Our process for the production of these new oxazines in its preferred embodiment consists, therefore, in the simultaneous oxidation and condensation of purpuramid compounds and substituted benzoic acids as specified above and reduction of the primarily formed hetero nuclear quinones or quinone-imides.

While this is our preferred process, it is also possible to obtain the same oxazines by oxidizing first the purpuramid alone to homo nuclear quinonic bodies, condensing then the same with the substituted benzoic acids to the above described probably hetero nuclear quinones or quinone imides, which are again reduced, as stated above, to the oxazines.

We have found that the most convenient method of jointly oxidizing and condensing the purpuramid compounds with the substituted benzoic acids is to carry out the reaction in sulfuric acid solution with manganese dioxide, pyrolusite, etc. Similar oxidation agents can be used with good results.

The reduction of the hetero nuclear quinonic bodies proceeds very easily and can, for instance, be effected with sulfurous acid, alkali metal bisulfites, etc. If these quinones or quinoneimides are applied directly to the animal fibres, the latter will act as reducing agents and the resulting dyeings will be identical with those obtained with the oxazines. With salts of the heavy metals, such as chromium, aluminum, iron, copper, etc., these oxazines form very fast lakes. They can be produced in substance as well as on the fibre.

In order to further illustrate our invention, the following examples are given, the parts being by weight:—It is to be understood that our invention is not limited to the examples given, nor to the exact conditions stated therein.

*Example 1.*—10 parts purpuramid are dissolved in 300 parts 95% sulfuric acid and 15 parts salicylic acid added. The temperature is brought to 8–10° C. and with good stirring a suspension of 15 parts finely divided manganese dioxid in 160 parts concentrated sulfuric acid slowly introduced. The yellow brown color of the solution gradually turns to a reddish blue. The course of the reaction can be followed by spectroscopical tests as follows:

Samples are taken from the sulfuric acid melt, drowned in water, reduced with a few drops bisulfite solution at boiling temperature, the precipitate filtered off, washed out and dissolved in sulfuric acid. As the reaction proceeds the color of this solution becomes more and more bright green and the spectrum of the oxazine more and more distinct, while the spectrum of the purpuramid, obtained by adding boric acid to the sulfuric acid solution and heating the sample gradually disappears. When no more, or only traces of purpuramid can be detected in this way the reaction mass is drowned in 5000 parts of water and 50 parts of commercial sodium bisulfite solution are added, and the solution brought to the boil. By drowning the sulfuric acid melt a reddish brown precipitate is obtained, through the reducing action of the sulfurous acid the color of the precipitates changes, especially during the boil, to a dark violet blue. When all of the quinonic body has been reduced to the oxazines, the solution is filtered off and the precipitate washed out. The product obtained can be used directly for dyeing wool.

If the pure 4-hydroxy-anthraquinone-4-hydroxy-benzol-3-carboxylic acid oxazine is desired, the moist precipitate is extracted with cold alcohol, which dissolves eventual unreacted purpuramid, and after drying recrystallized from pyridine. The pure dyestuff is soluble in hot alcohol and hot glacial acetic acid with a blue color. It is easily soluble in pyridine. By cooling a hot concentrated pyridine solution, the pyridine salt of the oxazine is obtained as dark violet crystals. The oxazine is soluble in caustic soda solution with a bluish green color. If such a solution is left standing in the air, oxidation to the heteronuclear quinone takes place and the color changes to a bluish violet. The solution of the oxazine in concentrated sulfuric acid is green and shows a characteristic absorption spectrum consisting of a heavy absorption band in the red part of the spectrum and a lighter one in the orange. Addition of boric acid to the sulfuric acid solution hardly changes its color, but the absorption lines become more distinct and can even be recognized in a nearly colorless solution. Manganese dioxid added to the sulfuric acid solution changes its color to a reddish blue, due to the formation of the quinonic body. The 4-hydroxy-anthraquinone -4-hydroxybenzol -3-carboxylic acid oxazine dyes wool in an acetic acid bath blue shades, on wool mordanted with aluminum salts exceedingly fast bright greenish blue shades and on chrome mordanted wool bluish green shades are obtained.

The 4-hydroxy-anthraquinone-4-hydroxy-benzole-3-carboxylic acid oxazine has most probably the following formula:

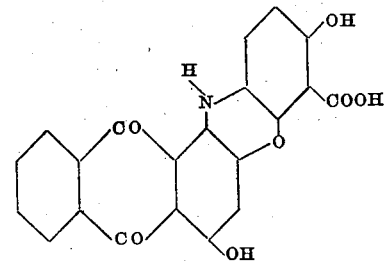

*Example 2.*—10 parts purpuramid are dissolved in 200 parts 95% sulfuric acid, cooled to 10° C. and 10 parts anthranilic acid added. A suspension of 15 parts manganese dioxid, containing 82% $MnO_2$ in 160 parts concentrated sulfuric acid is introduced, keeping the temperature between 2 and 3° C. The reaction is complete when no more or only traces of purpuramid can be detected by the spectroscopical test described in Example 1. The sulfuric acid melt is drowned in 5000 parts of water, 50 parts of commercial bisulfite of soda solution added and boiled. The precipitate of 4-hydroxy-anthraquinone-4-amino-benzol- 3 -carboxylic acid oxazine is filtered off, washed with water and dried. It represents a dark blue powder, insoluble in water and hot alcohol. It is soluble in hot pyridine with a greenish blue color and can be recrystallized from such a solution. The sulfuric acid solution is greenish blue. This solution shows a very characteristic absorption spectrum consisting of a strong well-defined band in the orange part of the spectrum and of a somewhat weaker band in the yellow. Addition of boric acid hardly changes the color and absorption spectrum of the sulfuric acid solution.

The 4-hydroxy-4-amino-benzol-3-carboxylic acid oxazine dyes wool in an acetic acid bath blue shades. On aluminium mordanted wool greenish blue shades and on chrome mordanted wool green shades are obtained.

*Example 3.*—10 parts purpuramid are dissolved in 150 parts concentrated sulfuric acid and 10 parts phenylglycin-ortho-carboxylic acid added. This solution is oxidized at low temperature with a suspension of 15 parts pyrolusite in concentrated sulfuric acid. The completion of the reaction is again shown by disappearance of the purpuramid absorption spectrum. The sulfuric acid melt is drowned in water, reduced with sodium bisulfite and the oxazine filtered off and dried. The 4-hydroxy-anthraquinone-phenylglycin-ortho-carboxylic acid oxazine is a dark blue powder, insoluble in water and alcohol, difficultly soluble even in hot pyridine. It dissolves in concentrated sulfuric acid with a greenish blue color, showing an absorption spectrum consisting of a strong well-defined band in the orange and a somewhat weaker band in the yellow part of the spectrum. Addition of boric acid to the sulfuric acid solution hardly changes its color or its absorption spectrum. The 4-hydroxy-anthraquinone phenylglycine-ortho-carboxylic acid oxazine dyes wool blue shades; on aluminium mordanted wool greenish-blue shades, very fast to light and milling are obtained; on chrome mordanted wool the oxazine dyes green shades. It has most probably the formula:

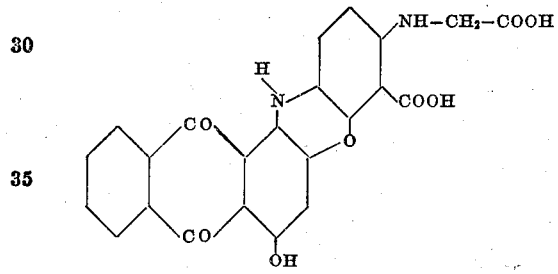

*Example 4.*—2 parts purpuramid are dissolved in 50 parts 95% sulfuric acid and this solution is oxidized at 8–10° C. with 10 parts manganese dioxid (87% $MnO_2$) suspended in 50 parts concentrated sulfuric acid. The dark yellowish brown purpuramid solution turns light reddish brown. 1½ parts salicylic acid are now added and the reaction stirred for a few hours at 10 to 20° C. The melt is drowned in water, reduced with sodium bisulfite, filtered and dried. The hydroxyanthraquinone-salicylic acid oxazine obtained contains some unreacted purpuramid, from which it is freed by extraction with cold alcohol. It is then identical with the product obtained according to Example 1.

*Example 5.*—10 parts purpuramid are jointly oxidized and condensed with 15 parts salicylic acid as described in Example 1. After drowning the melt the brown precipitate of the hetero nuclear quinonic body is filtered off and washed until neutral with cold water. The reddish brown precipitate easily dissolves in pyridine with an orange yellow coloration, in glacial acetic acid with a yellow red coloration. The coloration of the ammonia solution is blue, that in caustic soda solution greenish blue.

It dyes unmordanted wool in a boiling acetic acid bath blue, chrome mordanted wool green shades.

We claim:—

1. In the production of substituted 4-hydroxy-anthraquinone-benzoic acid oxazines having most probably the general formula:

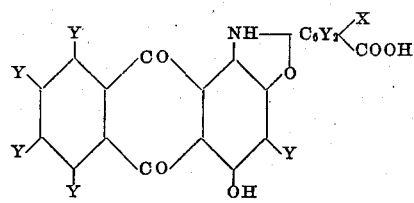

in which Y stands for hydrogen or another substituent such as methyl, sulfo, halogen, etc., the steps comprising the simultaneous oxidation and condensation of purpuramid compounds and substituted benzoic acids of the formula:

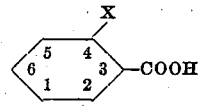

in which X stands for a hydroxyl, an alkylamino or an amino group and in which the position 1 is occupied by hydrogen, and the reduction of the primarily formed hetero nuclear quinonic bodies to the oxazines.

2. In the production of 4-hydroxy-anthraquinone-benzoic acid oxazines of the formula:

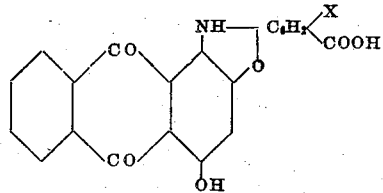

the steps comprising the simultaneous oxidaton and condensation of purpuramid and substituted benzoic acids of the formula:

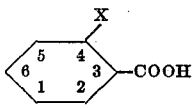

in which X stands for a hydroxyl, an alkylamino or an amino group, and the reduction of the primarily formed hetero nuclear quinonic bodies to the oxazines.

3. In the production of 4-hydroxyanthraquinone-4-hydroxybenzol-3-carboxylic acid oxazine the steps comprising the simultaneous oxidation and condensation of purpuramid and salicyclic acid, and the reduction of the primarily formed hetero nuclear quinonic body to the oxazine.

4. In the production of substituted 4-hydroxyanthraquinone-benzoic acid oxazines the steps comprising the oxidation of 1-amino-2.4-dihydroxyanthraquinone bodies to homo nuclear quinonic bodies, the condensation of same with benzoic acids of the formula:

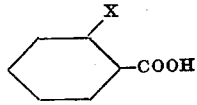

in which X stands for a hydroxyl, an alykylamino or an amino group and in which the position 1 is occupied by hydrogen, and reduction of the hetero nuclear quinonic bodies obtained to the oxazines.

5. In the production of 4-hydroxyanthraquinone-benzoic acid oxazines the steps comprising oxidation of purpuramid to homo nuclear quinonic bodies, condensation of same with benzoic acids of the formula:

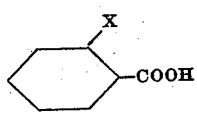

in which X stands for a hydroxyl, an alkylamino or an amino group, and reduction of the homonuclear quinonic bodies obtained to the oxazines.

6. In the production of the 4-hydroxyanthraquinone-4-hydroxy-benzol-3-carboxylic acid oxazine the steps comprising oxidation of purpuramid to homonuclear quinonic bodies, condensation of same with salicylic acid and reduction of the hetero nuclear body obtained to the oxazine.

7. In the production of the 4-hydroxyanthraquinone-4-hydroxy-benzol-3-carboxylic acid oxazine the steps comprising dissolving purpuramid and salicylic acid in concentrated sulfuric acid, adding manganese dioxid to this solution, precipitating the hetero nuclear quinonic body formed and reducing same with sodium bisulfite.

8. As new products the 4-hydroxy-anthraquinone-benzoic acid oxazines having most probably the general formula:

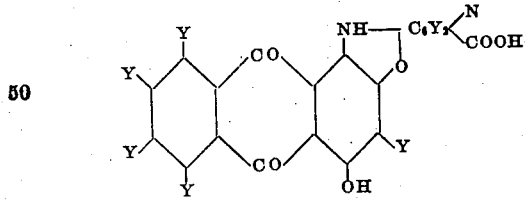

in which formula X stands for a hydroxyl, an alkylamino or an amino group and Y for hydrogen or another substituent, such as methyl, sulfo, halogen etc., which oxazines are dark bluish violet powders, soluble in caustic alkali with blue to green colors, which by standing in the air turn to bluish-violet, soluble in pyridine, soluble in concentrated sulfuric acid with green colors, which show characteristic absorption spectra consisting of a heavy band in the orange to red part of the spectrum and a lighter absorption band in the zones of shorter wave lengths, showing similar shades in sulfuric-boric acid solutions with similar but sharper absorption spectra, and dyeing wool in an acid bath from green to blue fast shades, giving on chrome mordanted wool bluish green to green shades, and on aluminium mordanted wool from bright blue to bluish green shades, fast to light and to milling.

9. As new products the 4-hydroxy-anthraquinone-benzoic acid oxazines having most probably the general formula:

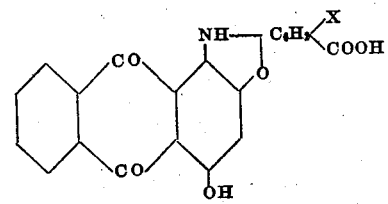

in which X stands for a hydroxyl, an alkylamino or an amino group, which oxazines are dark bluish violet powders, soluble in caustic alkali with a bluish green color, which turns reddish blue in the air, soluble in hot pyridine, soluble in sulfuric acid with green colors which show characteristic absorption spectra, consisting of a heavy absorption band in the red to orange part of the spectrum and a lighter absorption band in the zones of shorter wave lengths, showing similar shades in sulfuric-boric acid solution, with similar but better defined absorption spectra and which oxazines dye wool in an acid bath blue to green shades, give on chrome mordanted wool bluish-green to green shades and give on aluminium mordanted wool bright blue to greenish blue shades, fast to light and milling.

10. As a new product the 4-hydroxy-anthraquinone-4-hydroxybenzol-3-carboxylic acid oxazine having most probably the formula

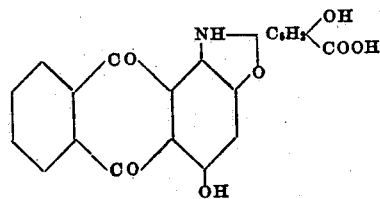

which oxazine is a dark bluish violet powder, soluble in caustic soda with a bluish green color, which turns reddish blue by standing in the air, easily soluble in hot, but difficultly soluble in cold pyridine, soluble in sulfuric acid with a green color, which solution shows an absorption spectrum consisting of a heavy absorption hand in the red and a lighter one in the orange part of the spectrum, soluble in sulfuric-boric acid with a similar color giving an absorption spectrum consisting of a well defined heavy line in the red and a somewhat weaker line in the orange part of the spectrum, which oxazine dyes wool in an acid bath blue shades, gives on chrome mordanted wool green shades and on aluminium mordanted wool bright bluish green shades fast to light and to milling.

11. As new products animal fibres dyed fast blue to green shades with the oxazines of claim 8.

12. As new products animal fibres dyed fast blue to green shades with the oxazines of claim 9.

13. As new products animal fibres dyed fast blue shades with the 4-hydroxy-anthraquinone-4-hydroxy-benzol-3-carboxylic acid oxazine.

14. As new products animal fibres dyed fast greenish-blue to green shades with the heavy metal lakes of the oxazines of claim 8.

15. As new products animal fibres dyed fast greenish blue to green shades with the heavy metal lakes of the oxazines of claim 9.

16. As new products animal fibres dyed fast greenish blue to green shades with the heavy metal salt lakes of the oxazine of claim 10.

17. As new products animal fibres dyed with the aluminium lake of the 4-hydroxy-anthraquinone-4-hydroxybenzol-3-carboxylic acid oxazine.

In testimony whereof we have hereunto set our hands.

ROBERT EMANUEL SCHMIDT.
BERTHOLD STEIN.